US012595057B2

(12) United States Patent
Mosebach

(10) Patent No.: US 12,595,057 B2
(45) Date of Patent: Apr. 7, 2026

(54) POWER MANAGEMENT AND DISTRIBUTION DEVICE

(71) Applicant: TQ-Systems GmbH, Seefeld (DE)

(72) Inventor: Dieter Mosebach, Mittelnkirchen (DE)

(73) Assignee: TQ-Systems GmbH, Seefeld (DE)

( * ) Notice: Subject to any disclaimer, the term of this patent is extended or adjusted under 35 U.S.C. 154(b) by 45 days.

(21) Appl. No.: 18/497,068

(22) Filed: Oct. 30, 2023

(65) Prior Publication Data

US 2024/0140606 A1 May 2, 2024

(30) Foreign Application Priority Data

Oct. 31, 2022 (EP) ..................................... 22204741

(51) Int. Cl.
B64D 11/00 (2006.01)
(52) U.S. Cl.
CPC ...... B64D 11/0015 (2013.01); B64D 2221/00 (2013.01)
(58) Field of Classification Search
CPC ............ B64D 11/0015; B64D 2221/00; B64D 11/0624; H02J 2310/44; H02J 1/08;
(Continued)

(56) References Cited

U.S. PATENT DOCUMENTS

| | | | | |
|---|---|---|---|---|
| 9,914,548 B1 * | 3/2018 | Vadillo | ...................... | H02J 1/14 |
| 2003/0132346 A1 * | 7/2003 | Lambiaso | .......... | B64D 11/0624 244/118.6 |

(Continued)

FOREIGN PATENT DOCUMENTS

| | | |
|---|---|---|
| CN | 117955199 A | 4/2024 |
| CN | 113852065 B | 12/2024 |

(Continued)

OTHER PUBLICATIONS

Extended European Search Report EP 22 204 741.7, dated Apr. 14, 2023. (9 pages).

(Continued)

*Primary Examiner* — Daniel Cavallari
*Assistant Examiner* — Thai H Tran
(74) *Attorney, Agent, or Firm* — Dority & Manning, P.A.

(57) ABSTRACT

The present invention relates to a power management and distribution device (4) for powering a personal electronic device via a direct current outlet unit (6a; 6b; 6i) at a passenger seat in an airplane cabin, the power management and distribution device (4) comprising: a first interface (12) for receiving electrical supply power (10); a second interface (14) for supplying electrical supply power (10) received at said first interface (12) to another power management and distribution device (4i); a third interface (16) for supplying electrical supply power (10) received at said first interface (12) to the direct current outlet unit (6a; 6b; 6i) for the personal electronic device; a further interface (15; 17) for supplying electrical supply power (10) received at said first interface (12) to either an inflight entertainment screen (17a; 17b; 17i) or an alternating current outlet (5a; 5b; 5i) at the passenger seat; a power measurement device (82; 80; 85) configured to measure the electrical outlet power (20) drawn via the third interface (16) and the further interface (15; 17); and a control unit (18) configured to compare an electrical outlet power (20) measured by the power measurement device (82; 80, 85) with a PED power limit and to control the electrical outlet power drawn by the direct current outlet unit (6a; 6b; 6i) via the third interface (16) based on said comparison.

13 Claims, 5 Drawing Sheets

(58) Field of Classification Search
CPC .......... H02J 1/14; H02J 7/00036; H02J 1/082;
H02J 1/084; H02J 1/10; H02J 3/007;
H02J 7/0013; H02J 7/0045; H02J 7/0047;
H02J 7/02
See application file for complete search history.

(56) References Cited

U.S. PATENT DOCUMENTS

| | | | |
|---|---|---|---|
| 2006/0117195 A1 | 6/2006 | Niwa et al. | |
| 2011/0231676 A1 | 9/2011 | Atkins et al. | |
| 2012/0173910 A1 | 7/2012 | Ballantyne et al. | |
| 2014/0325245 A1 | 10/2014 | Santini et al. | |
| 2018/0323626 A1* | 11/2018 | Suen | B60L 1/006 |
| 2018/0364779 A1 | 12/2018 | Shpiro | |
| 2019/0190288 A1 | 6/2019 | Suen et al. | |
| 2021/0356924 A1 | 11/2021 | Donnig et al. | |
| 2021/0379996 A1 | 12/2021 | Mosebach | |

FOREIGN PATENT DOCUMENTS

| | | | |
|---|---|---|---|
| EP | 1 335 473 | A2 | 8/2003 |
| EP | 1335473 | A3 | 6/2005 |
| EP | 3 330 836 | A1 | 6/2018 |
| EP | 3 367 535 | A1 | 8/2018 |
| EP | 3 922 553 | A1 | 12/2021 |
| EP | 3922553 | | 12/2021 |
| GB | 2 560 820 | A | 9/2018 |
| WO | WO 2013/134531 | A1 | 9/2013 |

OTHER PUBLICATIONS

Extended Search Report in EP Application No. 20179101.9, dated Nov. 24, 2020, in 16 pgs.
Extended Search Report in EP Application No. 22205576.6, dated Jan. 30, 2023, in 16 pgs.
Extended Search Report in EP Application No. 22204741.7, dated Apr. 14, 2023, in 9 pgs.

* cited by examiner

POWER MANAGEMENT AND DISTRIBUTION DEVICE

CROSS-REFERENCE TO RELATED APPLICATION

The present application claims priority to EP Application No. EP 22204741.7, filed Oct. 31, 2022, which is incorporated by reference herein in its entirety for all purposes.

TECHNICAL FIELD

The present invention relates to a power management and distribution device for powering personal electronic devices in an airplane cabin. Furthermore, the present invention relates to a power management and distribution system.

STATE OF THE ART

Electrical power for powering personal electronic devices (PEDs) onboard an airplane is often limited. To distribute the available power between a plurality of personal electronic devices, U.S. Pat. No. 9,914,548 B1 relates to a power management and load distribution circuit with a centralized control and distribution of electrical power for all PEDs. Furthermore, EP 3 922 553 relates to a power management and load distribution circuit with a decentralized control and distribution of electrical power for PEDs.

SUMMARY OF THE INVENTION

Within this disclosure, electrical power may be transmitted between two entities, e.g. units or devices, which are directly or indirectly electrically connected. A direct electrical connection between two entities is provided by only a power connection, e.g. a single cable or multiple connected cables (having one or multiple litz wires). In contrast, an indirect electrical connection between two entities is provided via at least one further entity, e.g., a third unit or device. Likewise, information or data may be transmitted between two entities, e.g., two units or devices, which are directly or indirectly electronically connected. A direct electronical connection between two entities is provided by only a data connection, e.g. a single data cable or multiple connected data cables (having one or multiple litz wires). In contrast, an indirect electronical connection between two entities is provided via at least one further entity, e.g. a third unit or device. In an indirect electronical connection between two entities, data processing in between said two entities may occur.

The present invention relates to a power management and distribution device (PMDD) for powering a personal electronic device (PED) via a direct current outlet unit. The PMDD may be configured to power a plurality of PEDs via a plurality of direct current outlet units. The direct current outlet unit may be configured to power a single or multiple PEDs. The direct current outlet unit may comprise a plug for powering one or multiple PEDs via a cable. Additionally or alternatively, the direct current outlet unit may be configured to power one or multiple PEDs wirelessly. The direct current outlet unit may be provided at a passenger seat in the cabin of an airplane. Each seat group in the cabin may be assigned to one PMDD for powering PEDs via outlet units at the seat group's seats. A seat group consisting of three seats may therefore comprise a single PMDD assigned to said group as well as a single outlet unit for each seat (three outlet units in total) powered by the single PMDD, for example. The PMDD may be retrofittable into existing airplanes. PEDs may include smartphones, tablets, laptops, and further personal electronic devices.

The PMDD of the present invention comprises a first interface for receiving electrical supply power from a master control unit (MCU) connected to a primary power source. The primary power source may be an alternating current (AC) power source and may provide primary electrical power to the MCU. The primary power source may be an aircraft engine, which may comprise a turbine driving a generator. The MCU may convert the primary electrical power received from said power source to electrical supply power for one or multiple PMDDs. Preferably, the first interface is configured to receive power in the form of an alternating current, more preferably in form of a three-phase alternating current, from the MCU. Furthermore, the PMDD comprises a second interface for supplying at least a portion of the electrical supply power received at said first interface to another PMDD. The first and second interfaces may be directly electrically and/or electronically connected inside the PMDD, e.g. inside a PMDD housing. Alternatively, said connection may be active and/or indirect, e.g. a control unit, such as a microcontroller, may receive power and/or data via the first interface from the MCU, may optionally process the data and/or convert the power and may supply said power and/or data via the second interface to another PMDD. Preferably, the second interface is configured to supply power in the form of an alternating current, more preferably in form of a three-phase alternating current, to another PMDD. The first and second interfaces may each be configured as a plug, e.g. comprising an EN4165 outlet, and/or may each provide a single or multiple power lines, e.g. for providing three phases of power.

The PMDD comprises a third interface for supplying at least a portion of the electrical supply power received at said first interface to the direct current outlet unit. The third interface may be configured as a plug, e.g. comprising a SUB-D outlet. The third interface may comprise one outlet for a plurality of direct current outlet units supplied by the PMDD with power. The third interface may comprise one outlet for each direct current outlet unit supplied by the PMDD with power. The first and third interfaces may be indirectly connected electrically and/or electronically inside the PMDD, e.g., inside a housing of the PMDD. The indirect electronical connection may be via a control unit.

The PMDD comprises a further interface for supplying electrical supply power received at said first interface to either an inflight entertainment screen or an alternating current outlet at the passenger seat. The PMDD may comprise a fourth interface for supplying electrical supply power received at said first interface to an inflight entertainment screen, preferably to a plurality of inflight entertainment screens, and a fifth interface for supplying electrical supply power received at said first interface to an alternating current outlet, preferably to a plurality of alternating current outlets. An inflight entertainment screen and an alternating current outlet may be assigned to each seat, which is powered by the PMDD. The inflight entertainment screen may be a screen attached to a passenger seat of the airplane. The inflight entertainment screen may be powered at the same voltage as the direct current outlet unit, preferably at a voltage larger than 20V DC, preferably between 20V DC and 30 V DC. The alternating current outlet may provide alternating current for powering a PED, preferably at a voltage between 100V and 300V, optionally at 110V.

The PMDD further comprises a power measurement device configured to measure the electrical outlet power drawn via the third interface and the further interface by the direct current outlet unit and the IFE display or the alternating current outlet. The power measurement device may comprise several separate power measurement units. The power measurement device and/or the power measurement unit(s) may comprise a voltmeter and/or an amperemeter. The PMDD may comprise a power measurement device configured to measure electrical outlet power drawn by each of the direct current outlet units, each of the alternating current outlets and/or each of the IFE displays individually. Alternatively or additionally, the power measurement device may be configured to determine a total electrical outlet power drawn by all direct current outlet units, a total electrical outlet power drawn by all alternating current outlets, and a total electrical outlet power drawn by all IFE displays of the PMDD.

In addition, the PMDD comprises a control unit, which may be a microcontroller, configured, i.e., specifically adapted, e.g., programmed, to compare an electrical outlet power measured by the power measurement device, e.g., the total outlet power drawn via the third interface measured by a power measurement unit of the power measurement device, with a PED power limit. The PED power limit may be predetermined and/or determined by the control unit and/or another device during processing. The control unit is configured to control the electrical outlet power drawn by the direct current outlet unit(s) via the third interface based on said comparison. The control unit may be powered by a fractional part of electrical supply power received at the first interface.

The PMDD may comprise a non-volatile memory connected to the control unit, wherein said non-volatile memory may comprise a power limit of the PMDD. The non-volatile memory may be at least readably accessible. The non-volatile memory may be one of an EPROM and/or an EEPROM. The power limit may be a PMDD specific value and/or a value which is determined based on the cabin layout. The power limit may be a static and predefined value which is not changed during normal and intended operation of the PMDD. The PED power limit may be the power limit of the PMDD or may be determined on the basis of the power limit of the PMDD.

Advantageously, by controlling the electrical outlet power for powering the direct current outlet unit(s) decentralized for each seat group via the PMDD of the present invention, a more versatile power distribution is made possible. Specifically, the available power for powering PEDs may be distributed more intelligently, ensuring an improved user experience. In particular, in the present invention, the power limits for the direct current outlet unit(s) may be controlled decentralized in the PMDDs, especially with relatively small PMDDs regarding the power they can supply, instead of centralized in the MCU. The present invention thus allows for the usage of relatively small PMDDs, which can be easily integrated in seat groups/the cabin, at the same time providing satisfactory power to a plurality of PEDs/users.

Furthermore, in the present invention, a single power limit can be assigned to the entire PMDD, instead of assigning different power limits to the different interfaces of the PMDD. Thus, instead of providing a power limit for the IFE screens, a different power limit for the direct current outlet units and a different power limit for the alternating current outlet, in the present invention, a single power limit is provided for the entire PMDD and therefore all of the above interfaces. By providing the power measurement device measuring the electrical outlet power drawn via the third interface and via the further interface, the PMDD of the present invention can assess how much power is actually requested via the different interfaces, e.g., how many IFE screens are turned on and/or how many alternating current outlets are used. Excess power not used by the IFE displays and/or the alternating current outlets can then be utilized for powering PED(s) via the direct current outlet unit(s) of the third interface. Thus, the present invention allows for smaller PMDDs with less power by providing an intelligent and holistic power management at seat group level. The PMDDs of the present invention are therefore smaller, more cost-efficient, have less weight and provide more space for passengers and baggage while not significantly effecting the power supply capabilities.

According to an embodiment of the invention, the control unit is configured to set a power limit for the electrical outlet power drawn by the direct current outlet unit via the third interface and to adjust said power limit to a non-zero value, preferably to a plurality of different non-zero values, based on the comparison of the electrical outlet power with the PED power limit. The control unit may be configured to either increase or decrease the power limit for the electrical outlet power drawn by the direct current outlet unit via the third interface to a non-zero value. In other words, in this embodiment, the direct current outlet unit is not switched off but a power limit for said outlet unit is adjusted to a non-zero value. The control unit may adjust said power limit to a non-zero value for all direct current outlets units connected to the third interface to ensure that all of said direct current outlet units do not draw more power from the PMDD than said power limit. Each of the direct current outlet units may be assigned the same power limit by the control unit. Alternatively, the control unit may assign an individual power limit to each of the direct current outlet units, wherein said individual power limits may be different from each other. When assigning power limit values to the direct current outlet units, the control unit may take the power needed for powering the direct current outlet units themselves into account.

According to an embodiment of the present invention, the control unit is configured to adjust the power limit for the electrical outlet power drawn by the direct current outlet unit to a finite number of non-zero discrete power limits. Said discrete power limits may be predetermined and stored on a non-volatile memory of the PMDD. Said discrete levels may be 15/10 W, 27 W, 45 W, and 60 W, for example. Said discrete power levels may form a multi-state signal. The control unit may be configured to adjust the power limit to one of said discrete power values based on the comparison. In other words, the control unit may assign one of said discrete values to each of its direct current outlet units.

According to an embodiment, the power management and distribution device comprises an interface for supplying electrical supply power received at said first interface to an alternating current outlet at the passenger seat. The interface can correspond to the further interface as described above. In this embodiment, the control unit is configured to switch the alternating current outlet on or off based on the comparison of the measured electrical outlet power with the PED power limit. In an embodiment, the power measurement device is configured to measure the power drawn via the third interface and the power drawn via the further interface, wherein the further interface can be an interface for supplying electrical supply power to an alternating current outlet at the passenger seat, preferably to a plurality of alternating current outlets at different passenger seats. The control unit is configured to compare the measured power, i.e., the power drawn via the third and further interfaces, with the PED power limit, and to decrease the power limit for the electrical outlet power drawn by the direct current outlet unit via the third interface to a non-zero value as described above and/or to switch the alternating current outlet at the further interface off if the measured power exceeds the PED power limit. In the present embodiment, the PED power limit may correspond to the power limit of the PMDD of no interface for supplying power to inflight entertainment screen(s) is provided. This embodiment allows for usage of power for alternating current outlet(s) by the direct current outlet unit(s) and vice versa. In this embodiment, the control unit may be configured to determine whether to decrease the power limit for the direct current outlet unit and/or to switch off the alternating current outlet on the basis of a priority setting, the priority setting being adjustable by a user to allow for a high flexibility in the PMDD usage.

According to an embodiment, the power management and distribution device comprises an interface for supplying electrical supply power received at said first interface to an inflight entertainment screen, preferably to a plurality of inflight entertainment screens. The interface can be the further interface as described above. The interface for the IFE screens can be provided in addition to the interface for the alternating current outlet(s). In this embodiment, the control unit is configured to subtract the power drawn via the interface for the inflight entertainment screen(s) from the power limit of the power management and distribution device described above, which may be stored on the non-volatile memory, to obtain the PED power limit. This embodiment ensures that the IFE displays are prioritized in the power supply. The remaining power that is still available once the IFE displays have been powered as requested is available for powering PEDs via the direct current outlet unit(s) and/or the alternating current outlet(s).

According to an embodiment, the power measurement device comprises a power measurement unit for measuring the electrical outlet power drawn via the third interface and a separate power management unit for measuring the electrical outlet power drawn via the further interface. The power measurement device may comprise a further power measurement unit for measuring the electrical outlet power drawn via the interface for supplying power to the IFE screen(s) and still a further power management unit for measuring the electrical outlet power drawn via the interface for supplying power to the alternating current outlet(s). This embodiment ensures that the power drawn via the different interfaces can be determined in a flexible and individualized manner. As described above, the PMDD may be configured to supply electrical supply power to a plurality of direct current outlet units via the third interface and to supply electrical supply power to a plurality of inflight entertainment screens or alternating current outlets via the further interface. The different power management units may be configured to determine the entire power drawn by all direct current outlet units via the third interface and all IFE displays/alternating current outlets via the further interface, respectively.

According to an embodiment of the invention, the PMDD comprises an AC/DC conversion device configured to convert AC electrical supply power supplied by the MCU via the first interface to DC electrical outlet power supplied to the direct current outlet units via the third interface. The AC electrical supply power may be in between 26-300 VAC, preferably between 100-130 VAC, more preferably around 115 VAC. Preferably, the DC electrical outlet power provided by the PMDD is larger than 20 VDC, preferably between 20-30 VDC, more preferably around 28 VDC. The AC/DC conversion device may comprise an AC/DC convertor and a separate DC/DC convertor. The AC/DC converter may comprise an active-rectifier. The DC/DC converter may comprise an LLC half-bridge or full bridge, an LLC transformer and/or a synchronous rectifier. The AC/DC converter and/or the DC/DC converter may be controllable, preferably by the control unit of the PMDD. This embodiment provides the advantage that the device comprising the AC/DC conversion device is also configured to limit the power drawn by the PEDs via the outlet units of the PMDD.

The PMDD may comprise a housing, preferably a single housing which may be made from aluminum, in which all components of the power management and distribution device may be housed. The interfaces of the power management and distribution device, e.g., the first, second, third and further interface, may be provided as plugs at the outer surface of the housing.

According to an embodiment of the present invention, the control unit is configured to generate a power control signal for communicating a power limit for the electrical power drawn by the direct current outlet unit, preferably by all direct current outlet units, via the third interface. In addition, the PMDD is configured to send the power control signal to the direct current outlet, preferably to all direct current outlet units of the PMDD, via the third interface. The power control signal may be sent periodically or continuously by the PMDD. The direct current outlet unit connected to the third interface of the PMDD may receive the power control signal and may implement the power control on its own. For example, if the control unit of the PMDD determines that the power of one or multiple direct current outlet unit(s) should be limited to a certain value, the power control signal may transport said information to the direct current outlet unit(s), which may implement said power limitation. This embodiment provides the advantage that the power limitation is implemented directly at the direct current outlet unit(s), thereby simplifying the configuration of the PMDD.

Furthermore, the present invention relates to a power management and distribution system (PMDS) comprising a PMDD according to the above-described embodiment and a direct current outlet unit connectable to the third interface of the PMDD, preferably via a cable. The direct current outlet unit may comprise at least one USB outlet and may be configured to supply electrical outlet power to a PED connected to said USB outlet. The direct current outlet unit may comprise an outlet plug for USB-C and a further different outlet plug for USB-A. This allows for connection and/or charging of a variety of different PEDs over a single outlet unit. Each direct current outlet unit may comprise a separate housing, e.g., a plastic housing, in which all of its components may be accommodated. The direct current outlet unit comprises a power limiter configured to receive the power control signal from the power management and distribution device and to limit the electrical power drawn by the direct current outlet unit via the third interface to the power limit communicated with the power control signal. The direct current outlet unit may be unidirectionally electronically connected to the PMDD, preferably via the third interface of the PMDD. Said connection may be a direct electronical connection between the PMDD and the outlet unit. The direct current outlet unit may implement the received power control signal, e.g., by using a converter and/or a transistor, to limit the power drawn by the PED connected to said outlet unit according to the power control signal. Preferably, the PMDS may comprise more than one, e.g., two, three, four or five, of such direct current outlet units, which are connectable to the third interface of the PMDD.

According to an embodiment of the present invention, the direct current outlet unit comprises a power delivery unit (PDU) configured to negotiate a power contract with a coupled PED based on the power control signal received from the PMDD via the third interface. The negotiation may be done via a handshake function between the direct current outlet unit and the PED. The PDU may be a power delivery controller which may use the USB-PD standard. Preferably, the negotiation may include the limitation indicated by the power control signal from the PMDD. The PDU may control said converter and said transistor to provide electrical outlet power to the PED according to the negotiation and the power control signal. Advantageously, by combining the negotiation and power limitation, one functionality of the direct current outlet unit may be used to achieve two purposes. This results in a PMDD with simplified configuration and reconfiguration.

According to an embodiment, the PMDS comprises at least two direct current outlet units connected to the third interface and at least two alternating current outlets or two inflight entertainment screens connected to the further interface. In an embodiment, a seat group comprising a number of seats, e.g., 2, 3, 4 or 5 seats, a PMDS according to any of the above-described embodiments, a direct current outlet unit for each seat of the seat group, and an inflight entertainment screen and/or an alternating current outlet for each seat of the seat group is provided.

According to an embodiment of the present invention, the PMDS further comprises a MCU configured to receive primary electrical power from a primary power source. Further, the PMDS comprises a plurality of PMDDs according to any of the above-described embodiments, each configured to receive electrical supply power from the MCU via its first interface. The PMDS may comprise the primary power source. The MCU may be configured to measure electrical supply power supplied to the PMDDs and may be configured to compare this with a predefined value, which may be stored on a non-volatile storage of the MCU. The MCU may determine a signal, e.g., a tri-state signal, based on said comparison. The MCU may indicate via the signal, e.g., the tri-state signal, a switching-off of all unused outlet units in case of higher electrical supply power drawn by the PMDDs compared to the predefined value of the MCU. The MCU may indicate via the signal, e.g., the tri-state signal, a switching-off of all outlet units in case of take-off or landing. The MCU may indicate via the signal, e.g., the tri-state signal, to use all outlet units in case of lower electrical supply power drawn by the PMDDs compared to the predefined value of the MCU. Each of the PMDDs may be configured to receive said signal from the MCU either via a direct electronical connection to the MCU or via an indirect electronical connection to the MCU. Each PMDD's control unit may be configured to determine the power control signal based on the signal, e.g., the tri-state signal, received from the MCU via the first interface.

According to an embodiment of the present invention, a first PMDD is connected to the MCU via its first interface directly electrically and electronically, and a second PMDD is connected to the MCU via its first interface indirectly electrically and electronically. Specifically, the second PMDD is connected via its first interface electrically and electronically directly to the second interface of the first PMDD in a daisy chain fashion.

DETAILED DESCRIPTION OF EMBODIMENTS

Figure 1:
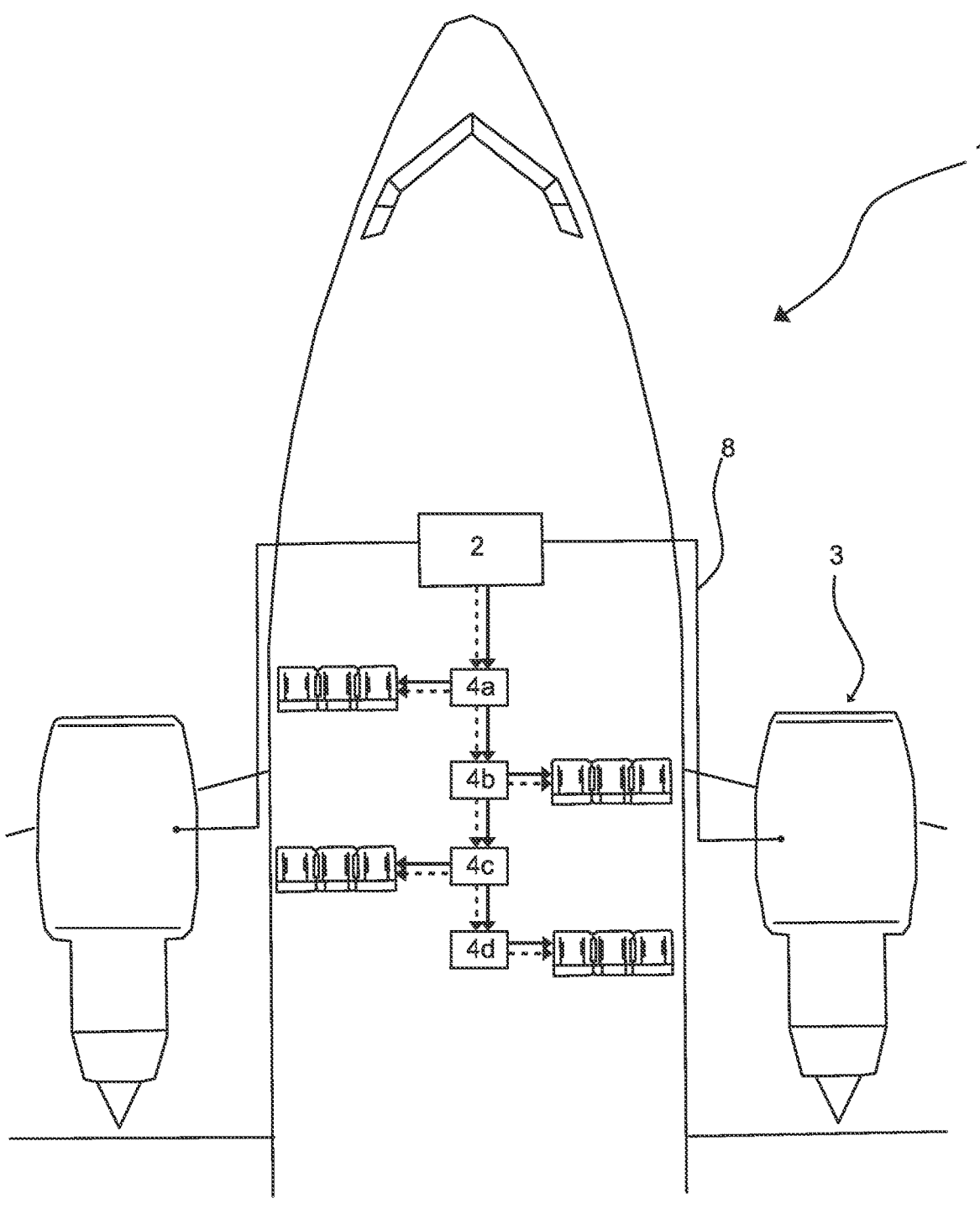
FIG. 1 schematically shows an airplane cabin with a power management and distribution system according to an embodiment of the present invention.

FIG. 1 shows a power management and distribution system (PMDS) 1 in an airplane cabin according to an embodiment of the present invention. The power management and distribution system 1 is configured to power personal electronic devices at a plurality of seats in said airplane cabin. The PMDS comprises a master control unit (MCU) 2, which is electrically connected directly or indirectly to a primary power source 3. The primary power source 3 shown in FIG. 1 is an aircraft turbine, which comprises a turbine driving a generator (not shown). The primary power source 3 supplies the MCU 2 with primary electrical power 8, in the present embodiment with AC power. The MCU 2 is electrically and electronically connected to a plurality of power management and distribution devices (PMDDs) 4a-4d. Each of the PMDDs 4a-4d is configured to power a plurality of personal electronic devices via outlet units as well as inflight entertainment displays (IFE displays). In the present embodiment, a first PMDD 4a is electrically and electronically connected directly to the MCU 2, wherein the further PMDDs 4b-4d are electrically and electronically connected indirectly to the MCU 2 via further PMDDs in a daisy chain fashion (see also FIG. 2).

Figure 2:
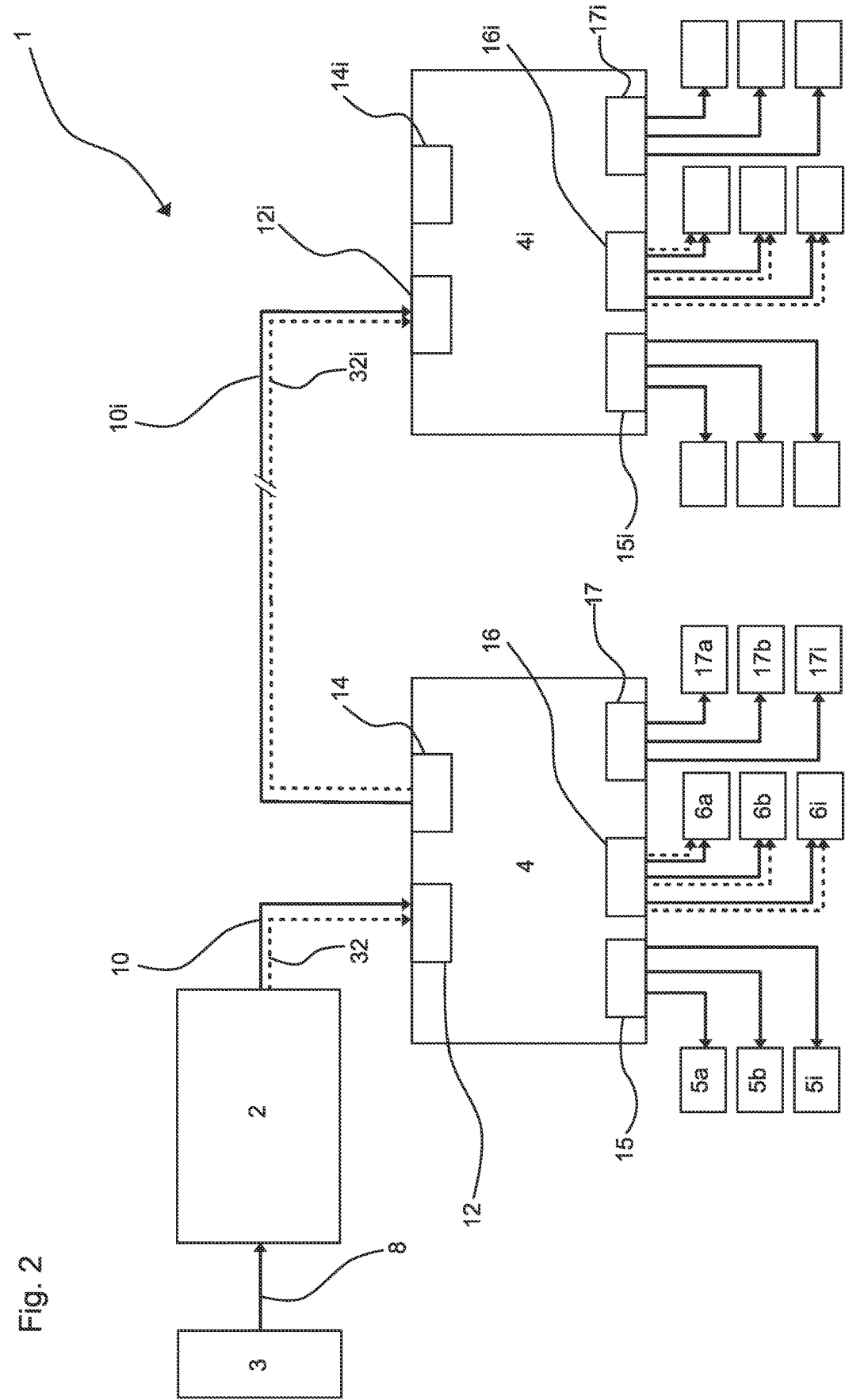
FIG. 2 schematically shows the power management and distribution system of FIG. 1.

Each PMDD 4 may be assigned to a single seat group, e.g., a seat group consisting of 2, 3, 4 or 5 individual seats. As depicted schematically in FIG. 1, PMDD 4a may manage and distribute power for the front left seat group and PMDD 4b may manage and distribute power for the front right seat group. In an embodiment, multiple outlet units of each seat group as well as multiple IFE displays of each seat group may be electrically and electronically connected to the corresponding PMDD 4, as illustrated in FIG. 2. In an embodiment of the invention not shown in the figures, each cabin zone, e.g. the first class, business class and/or economy class, could be provided with a separate MCU 2, each of said MCUs 2 being connected to the primary power source 3, e.g. in the above-described fashion.

FIG. 2 shows the PMDS 1 of FIG. 1 in more detail. As derivable from FIG. 2, PMDD 4 comprises a first interface 12 for receiving electrical supply power 10, optionally a three-phase electrical power, and a signal 32, optionally a tri-state signal, directly from the MCU 2. The PMDD 4 comprises a second interface 14 for supplying at least a part of the electrical supply power 10 received at said first interface 12, optionally the three-phase electrical power, as well as the signal 32, optionally the tri-state signal, to another PMDD 4i. The PMDD 4i also comprises a first interface 12i for receiving electrical supply power 10i, optionally the three-phase electrical power, and the signal 32, optionally the tri-state signal, from the MCU 2, i.e. indirectly via at least the other PMDD 4.

The PMDD 4 comprises a third interface 16 connected to direct current outlet units 6a, 6b, 6i, which are USB outlet units in the present embodiment, for supplying electrical outlet power to personal electronic devices (PEDs). The USB outlet units 6a, 6b, 6i may be located at passenger seats and/or in the IFE screens in the airplane cabin. The number of USB outlets units 6a, 6b, 6i can be related to the number of seats assigned to the PMDD, e.g., be the same or double of the number of seats. The USB outlet units 6a, 6b, 6i are electrically and electronically connected directly to the PMDD 4. In the present embodiment, each USB outlet unit 6a, 6b, 6i comprises its own electrical line and its own electronic data line, as shown in FIG. 2. Preferably, the USB outlet units 6a, 6b, 6i are configured to draw power from the PMDD 4 and to receive data from the PMDD 4. In an embodiment, the data connection of the USB outlet units 6a, 6b, 6i to the PMDD 4 is uni-directional such that the outlet units 6a, 6b, 6i only receive data from the PMDD 4 but cannot send data to the PMDD 4. The PMDD and the third interface 16 can be configured to supply direct current power to the USB outlets units 6a, 6b, 6i, e.g., in the range between 5V DC and 100V DC, optionally between 5 V DC and 50V DC, preferably between 20V DC and 30V DC. In an embodiment, the direct current power is supplied at 28 V DC. The USB outlets units 6a, 6b, 6i can be configured as USB Power Delivery outlets as described below.

The PMDD 4 comprises a fourth interface 17 for supplying electrical power to inflight entertainment (IFE) screens 17a, 17b, 17i. The number of IFE screens 17a, 17b, 17i connected to the PMDD 4 via the fourth interface 17 may be equal to the number of seats assigned to the PMLD 4. The PMDD 4 may switch the power supplied to each of the IFE screens 17a, 17b, 17i via the fourth interface 17 on and off. In an embodiment, the PMDD 4 may switch the power supplied to each of the IFE screens 17a, 17b, 17i on and off individually, i.e., independently form each other. The power supplied to a first IFE screen 17a may be switched off while the power to the other IFE screens 17b, 17i is still supplied, for example. Furthermore, the PMDD 4 comprises a fifth interface 15 for supplying electrical power to alternating current outlets 5a, 5b, 5i. The number of alternating current outlets 5a, 5b, 5i can be equal to the number of seats assigned to the PMDD 4. The PMDD 4 may switch the power supplied to each of the alternating current outlets 5a, 5b, 5i on and off, preferably individually as described above in connection with the IFE screens.

Each of the PMDDs 4i of the PMDS 1 of FIG. 2 may be configured identical to the PMDD 4. In the embodiment shown in FIG. 1, three seats are assigned to a PMDD 4a. Each of said seats assigned to a PMDD 4a can comprise an IFE screen, a USB outlet unit and an alternating current outlet. Thus, in this embodiment, three IFE screens are connected to the PMDD 4a via the fourth interface 17, three alternating current outlets are connected to the PMDD via the fifth interface 15 and three USB outlet units are connected to the PMDD via the third interface 16. In other embodiment, less or more seats can be assigned to a PMDD.

Figure 3:
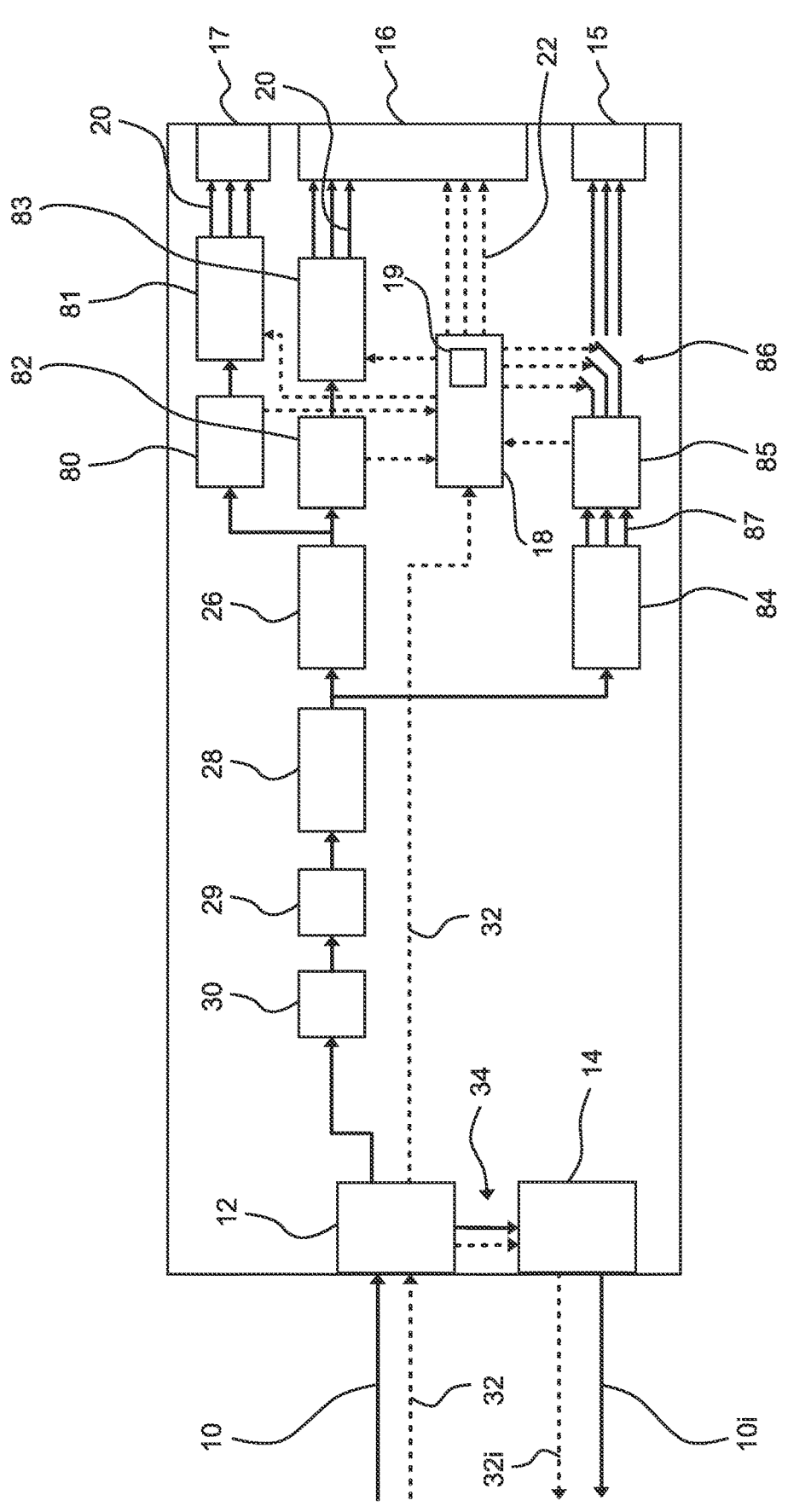
FIG. 3 schematically shows a power management and distribution device of the power management and distribution system of FIG. 2 according to an embodiment of the present invention.

The PMDD 4 of FIG. 2 is shown in more detail in FIG. 3. As derivable from FIG. 3, the first interface 12 of the PMDD 4 is electrically and electronically connected with the second interface 14 of the PMDD 4 via a connector 34. The connector 34 may be a daisy chain connector, enabling a connection of multiple PMDDs 4i in a daisy chain fashion. The connection between the first and second interfaces 12, 14 may be a direct connection. The second interface 14 may supply AC electrical supply power 10i to another PMDD 4i, optionally at least part of the three-phase electrical power received at the first interface 12. Furthermore, the second interface 14 may send the signal 32, which may be a tri-state signal, received at the first interface 12 from the MCU 2 to another PMDD 4i.

The first interface 12 is, preferably directly, electrically connected to an input filter 30 to supply an electrical power thereto. Preferably, the input filter 30 may comprise a common mode and/or a differential mode filter. Additionally, the input filter 30 may comprise a fuse and an inrush limiter and/or temperature fuse protecting the further electronics within the PMDD 4 against high currents from the MCU 2. The input filter 30 is, preferably directly, electrically connected to an AC/DC converter 29. The AC/DC converter 29 may comprise an active rectifier. The AC/DC converter 29 may be controlled by a control unit, e.g., the control unit 18. The AC/DC converter 29 is, preferably directly, electrically connected to a power factor correction (PFC) unit 28. The PFC unit 28 may be controlled by a control unit, e.g., the control unit 18. The PFC unit 28 may control the AC/DC converter 29, e.g., increase the power factor of the power converted by the AC/DC converter 29 for improving the performance of the PMDD 4. The PFC unit 28 is, preferably directly, electrically connected to a DC/DC converter 26. The DC/DC converter 26 may comprise an LLC half bridge or full bridge, an LLC transformer, and a synchronous rectifier. The DC/DC converter 26 may be controlled by a control unit, e.g., the control unit 18. The DC/DC converter 26 may convert high DC voltage power to low DC voltage power.

The DC/DC converter 26 is connected to both the fourth interface 17 for the IFE screens 17a, 17b, 17i and the third interface 16 for the USB outlet units 6a, 6b, 6i. A first power transmission path is provided for powering the IFE screens, which comprises a power measurement unit 80, e.g., a current sensing unit, and a switching unit 81. The switching unit 81 may comprise a separate switch for each IFE screen assigned to the PMDD 4. In the present embodiment, the switching unit 81 may thus comprise three switches, one switch for each seat assigned to the PMDD 4. The DC/DC converter 26 is electrically connected, preferably directly connected, to the power measurement unit 80, which is electrically connected, preferably directly, to the switching unit 81. The switching unit 81 comprises a power outline for each switch and therefore for each IFE screen, which electrically connects, preferably directly connects, the switch with the fourth interface 17. A second power transmission path is provided for powering the USB outlet units, which comprises a power measurement unit 82, e.g., a current sensing unit, and a switching unit 83. The switching unit 83 may comprise a separate switch for each USB outlet unit assigned to the PMDD 4. In the present embodiment, the switching unit 83 may thus comprise three switches, one switch for each seat assigned to the PMDD 4. The DC/DC converter 26 is electrically connected, preferably directly connected, to the power sensing unit 82, which is electrically connected, preferably directly, to the switching unit 83. The switching unit 83 comprises a power outline for each switch and therefore for each USB outlet unit, which electrically connects, preferably directly connects, the switch unit 83 with the third interface 16.

The power measurement unit 80 and/or the power measurement unit 82 can be configured to measure the total power extracted from the PMDD 4 by the IFE screens via the fourth interface 17 and the USB outlet units via the third interface 16, respectively. In an alternative embodiment, a power measurement unit can be provided for each switch of the switching unit 81 and/or for each switch of the switching unit 83. The individual power measurements in the first power transmission path and/or the second power transmission path can then be added to determine the total power drawn from the PMDD 4 by the IFE screens via the fourth interface and the USB outlet units via the third interface 16, respectively.

An AC/DC conversion device comprising the AC/DC converter 29, the PFC unit 28 and the DC/DC converter 26 may be configured to convert the AC electrical supply power 10 supplied from the MCU 2 via the first interface 12 into DC electrical outlet power 20. The DC electrical outlet power provided by the DC/DC converter 26 may be drawn by personal electronic devices via the USB outlet units, which are not shown in FIG. 3, but which will be described in connection with FIG. 4 below, and the IFE screens. The DC/DC converter 26 is configured to convert a relatively high DC voltage present downstream of the AC/DC converter 29 into a voltage suitable for the IFE screens and the USB outlet units. In the present embodiment, the output voltage of the DC/DC converter may be above 20 V DC, preferably between 24V and 30 V DC, and is more preferably 28 V DC.

In addition, the PMDD 4 comprises a separate DC/AC converter 84, which is electrically connected, preferably directly, to the PFC unit 28. In the present embodiment, the DC/AC 84 converter is connected to the fifth interface 15 for the alternating current outlets via a third power transmission path. The third power transmission path comprises a power measurement unit 85, which is electrically connected, preferably directly, to the DC/AC converter 84 and a switching unit 86, which electrically connects, preferably directly, the power measurement unit 85 with the fifth interface 15. In the present embodiment, the DC/AC converter 84 provides a separate power line 87 for each alternating current outlet, e.g., for each seat assigned to the PMDD 4, which are each electrically connected to a separate power measurement component of the power measurement unit 85. The respective power measurement components are respectively electrically connected to the fifth outlet 15 via a separate switch of the switching unit 86.

All of the power measurement units 80, 82, 85 described above may comprise one or multiple volt- and/or amperemeter(s) configured to measure the voltage against ground and/or the current drawn through the unit. The power measurement units 80, 82, 85 may be configured to send the result of the power measurement to the control unit 18 and may together form a power measurement device.

The control unit 18 of the PMDD 4 is, preferably directly, electronically connected to the first interface 12. The control unit 18 receives the signal 32, e.g., the tri-state signal, from the MCU 2 via the first interface 12. The control unit 18 may be configured to determine a power control signal 22 based on the signal 32 and the result of the measured power provided by the power measurement units 80, 82 and/or 85. The control unit 18 is electronically connected to a non-volatile memory 19. The non-volatile memory may be a RAM, EPROM and/or EEPROM. The non-volatile memory 19 may store a power limit of the PMDD 4 and may describe the power capability of the entire PMDD 4. The power limit may be the entire power that the PMDD4 4 can provide for the IFE screens, the USB outlet units and the alternating current units. The control unit 18 may be a microcontroller.

Figure 4:
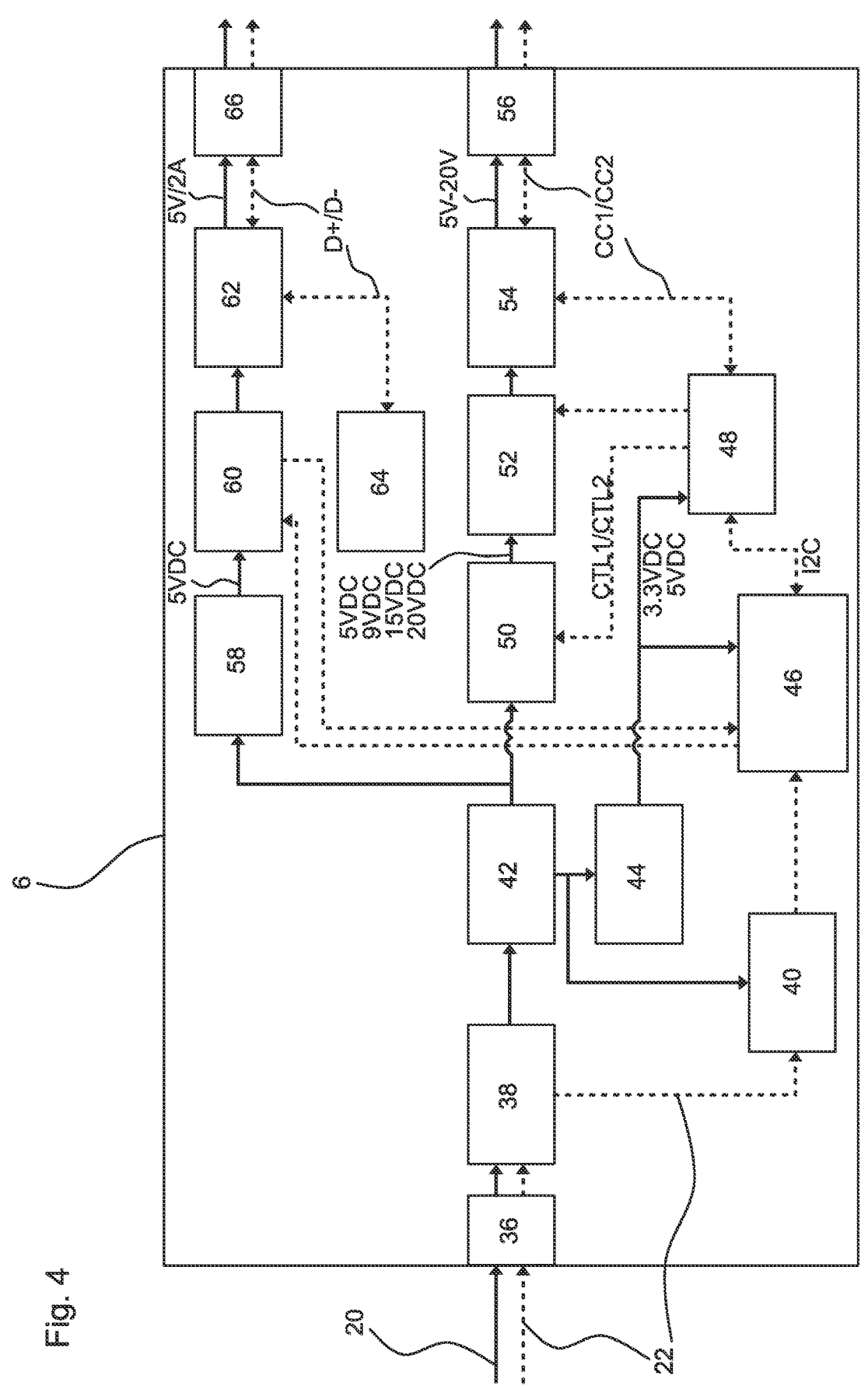
FIG. 4 schematically shows a direct current outlet unit of the power management and distribution system of FIG. 2 according to an embodiment of the present invention.

An embodiment of one outlet unit 6, which may be coupled via the third interface 16 to the PMDD 4 shown in FIG. 3, is shown in FIG. 4. As described above, multiple outlet units 6 may be connected to the third interface 16 of the PMDD 4, which may each be configured as the outlet unit 6 described below. The outlet unit 6 is supplied with at least a part of said DC electrical outlet power 20 and the power control signal 22 from the PMDD 4 via the third interface 16 that is directly connected to an input plug 36. The outlet unit 6 may also be connected to the ground of the PMDD 4 via the input plug 36. The input plug 36 may be a SUB-D plug. The input plug 36 is, preferably directly, electrically and electronically connected to a lightning and ESD protection unit 38. The lightning and ESD protection unit 38 may protect the further electronic parts of the outlet unit 6 against high potential differences. The power control signal 22 is supplied from the lightning and ESD protection unit 38 to a multiple stage, e.g., 5-state, logic unit 40, which provides a multiple state, e.g., 5-state, signal to a control unit 46 of the outlet unit 6. The lightning and ESD protection unit 38, the multiple state logic unit 40, and the control unit 46 are electronically connected. The control unit 46 may be a microcontroller.

The lightning and ESD protection unit 38 is, preferably directly, electrically connected to a filter unit 42, which preferably provides direct current power with a voltage over 20V, optionally at 28V DC. The filter unit 42 is electrically connected to the multiple state logic unit 40 to supply said unit with power. Furthermore, the filter unit 42 is electrically connected to a DC/DC converter 44 for supplying power to the control unit 46 and a power delivery unit 48, which may be USB-PD device. The DC/DC converter 44 may convert the voltage of the filter unit 42, e.g., 28V DC to a lower voltage, e.g., 3.3V DC and 5 VDC to power the power delivery unit 48 and the control unit 46, respectively. The power delivery unit 48 may be a PD controller, preferably a USB-PD controller. The power delivery unit 48 is electronically connected via an I2C to the control unit 46. The power delivery unit 48 may receive a communicative signal from the control unit 46, e.g. the power control signal 22, which is supplied via the plug 36 from the PMDD.

The outlet unit 6 shown in FIG. 4 comprises one outlet plug for USB-C 56 and one outlet plug for USB-A 66. Alternatively, each outlet unit 6 may only comprise one outlet plug for USB-C 56. A PED may be coupled with each of the plugs 56, 66. The outlet plug for USB-C 56 is electrically and electronically directly connected to a filter and/or lightning and ESD protection 54, which is configured to protect a coupled PED. The filter and/or lightning and ESD protection 54 is electrically connected directly to a transistor 52, preferably a MOSFET. The transistor 52 is electronically connected to the power delivery unit 48 and electrically connected to a variable DC/DC converter 50. The DC/DC converter 50 is electrically connected to the filter unit 42 and is supplied by the filter unit 42 with DC electrical outlet power 20, preferably 28V DC. The DC/DC converter 50 is electronically connected to the power delivery unit 48 via CTL1/CTL2. The power delivery unit 48 is electronically connected via the filter/lightning and ESD protection 54 to the output plug for USB-C 56 and is configured to negotiate via CC1/CC2 a power contract with a PED coupled to the output plug for USB-C 56. Based on the received power control signal 22 received from the PMDD 4 via the I2C from the control unit 46, the power delivery unit 48 may negotiate the power contract according to said power control signal 22. For example, the power delivery unit 48 may control the DC/DC convertor 50 to convert the voltage to an aspired value. Likewise, the power delivery unit 48 may control the transistor 52 to limit the voltage and/or current to an aspired value. Thus, the power delivery unit 48 may limit the power drawn by a PED connected to the USB-C plug 56 to an aspired value, which was determined by the control unit 18 of the PMDD and provided to the outlet unit 6 via the third interface 16.

Shown for this embodiment is also the outlet plug for USB-A 66 and corresponding electronics. The USB-A functionality may be omitted in another embodiment of the invention. The outlet plug for USB-A 66 is electrically and electronically connected to a filter/lightning and ESD protection 62. Said protection 62 may be configured to protect a coupled PED. The filter/lightning and ESD protection 62 is electronically connected to a charging port controller 64. The charging port control may control the power supplied via the filter/lightning and ESD protection 62 to the PED coupled to the outlet plug for USB-A 66. This may be done via a further transistor, which is not shown. The control of the power supplied to the PED may be done based on a negotiation via D+/D− communication between the charging port controller 64 and the PED via the outlet plug for USB-A 66 and the filter/lightning and ESD protection 62. The filter/lightning and ESD protection 62 is electrically connected to a transistor 60, preferably a MOSFET. The transistor 60 is electronically connected to the control unit 46, which may switch the transistor 60 and thus the USB-A plug 66 on or off. Alternatively, the power may be limited to a level between minimum (off) and maximum (on) power. The transistor 60 may send an over current signal to the control unit 46 in order to indicate a current limit reached by the transistor 60. The transistor 60 is electrically connected to a DC/DC converter 58, which may be configured to convert 28V DC electrical outlet power 20 from the filter unit 42 to 5V DC supplied to the transistor 60.

Figure 5:
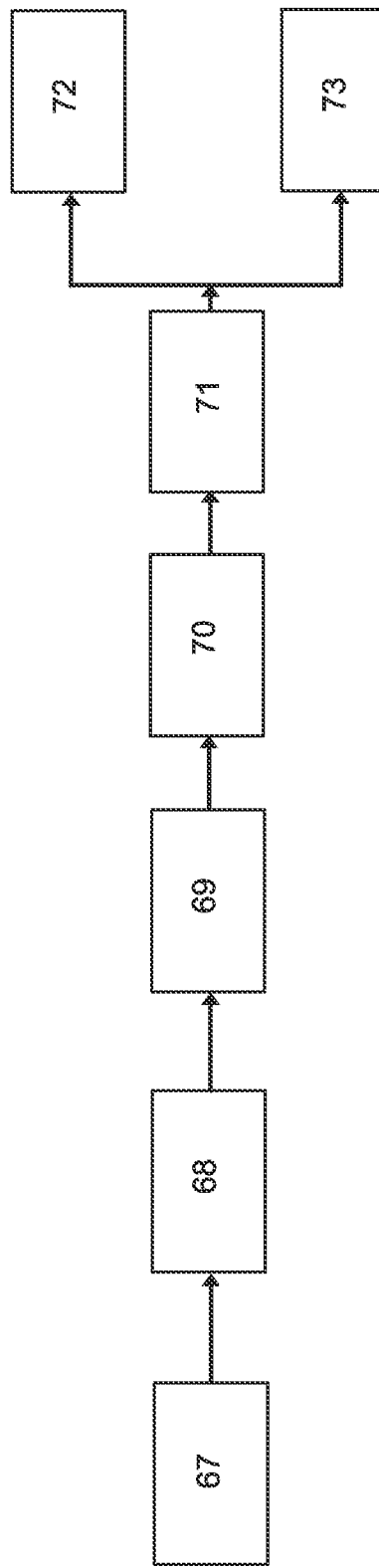
FIG. 5 schematically shows a state flow diagram of a method for managing and distributing power in an airplane cabin according to an embodiment of the present invention.

FIG. 5 schematically shows the steps of a method for managing and distributing power in an airplane cabin with the power management and distribution device shown in FIG. 3 according to an embodiment of the present invention. Specifically, the control unit 18 of the PMDD 4 may be configured to execute the below described method. Optionally, the method may comprise a step of receiving 67 the signal 32, e.g., the tri-state signal, from the MCU 2. Based on the signal 32, e.g., the tri-sate signal, received from the MCU, the control unit 18 of the PMDD 4 may switch some or all direct current outlets units 6a, 6b, 6i connected to the third interface 16 and some or all of the alternating current outlets 5a, 5b, 5i at the fifth interface off by providing respective control signals to the switching unit 83 and the switching unit 86.

Furthermore, the method comprises a step of measuring 68 with the power measurement unit 80 the electrical outlet power drawn from the PMDD by inflight entertainment screens 17a, 17b, 17i via the fourth interface 17 and of providing this measurement to the control unit 18. The control unit 18 then subtracts 69 this measurement from the power limit of the PMDD 4 stored on the memory 19 to obtain the PED power limit. The remaining PED power, i.e., the difference of the power limit of the PMDD 4 and the power requested via the fourth interface 17, is available for the PEDs via the third interface 16 and the fifth interface 15. The control unit 18 may thus prioritize the inflight entertainment screens and ensure that these are provided with the requested power.

In a subsequent step 70, the method comprises a step of measuring the power drawn by the alternating current outlets 5a, 5b, 5i via the fifth interface 15 with the power measurement unit 85 and the power drawn by the direct current outlet units 6a, 6b, 6i via the third interface 16 with the power measurement unit 82. These measurements are sent to the control unit 18, which then compares 71 the sum of these measurement with the PED power limit determined in step 69.

If the power requested via the third and fifth interfaces 16, 15 is larger than the PED power limit, the control unit 18 is configured to generate and send 72 a power control signal 22 for communicating a power limit that has been decreased to a non-zero value to the direct current outlet units 6a, 6b, 6i connected to the third interface 16. In an embodiment, there are discrete power limits and the control unit may be configured to select one of these discrete power limits and communicate said power limit to the direct current outlet units via the power control signal 22. The same power limit can be communicated to all of the direct current outlet units 6a, 6b, 6i which have not been switched-off by the signal 32 received from the MCU. The direct current outlet units 6a, 6b, 6i will each limit the power drawn by connected PEDs to the power limit communicated with the power control signal 22 as described in connection with FIG. 4. Additionally, if the power requested via the third and fifth interfaces 16, 15 is larger than the PED power limit, the control unit 18 is configured to switch 73 one or more alternating current outlets 5a, 5b, 5i off via the switching unit 86. The priority whether and which alternating current outlets 5a, 5b, 5i are switched-off and/or whether the power limit for the direct current outlets 6a, 6b, 6i is decreased can be arbitrarily selected and is preferably adjustable by a user.

LIST OF REFERENCE SIGNS

1 power management and distribution system
2 master control unit
3 primary power source
4, 4a-4d power management and distribution device
5, 5a, 5b, 5i alternating current outlet
6, 6a, 6b, 6i direct current outlet unit
8 (AC) primary electrical power
10 (AC) electrical supply power
12, 12i first interface
14 second interface
15 fifth interface
16 third interface
17 fourth interface
17a, 17b, 17i IFE screens
18 control unit
19 non-volatile memory
20 (DC) electrical outlet power
22 power control signal
24 power measurement unit
26 (DC/DC) converter
28 power factor correction unit
29 (AC/DC) converter
30 input filter
32 tri-state signal
34 (daisy chain) connector
36 input plug (of outlet unit)
38 lightning and ESD protection unit
40 multi-state logic unit
42 filter unit
44 (DC/DC) converter
46 control unit (of outlet unit)

48 power delivery unit
50 (DC/DC) converter unit
52 transistor (for USB-C outlet)
54 filter/lightning and ESD protection (for USB-C outlet)
56 output plug for USB-C
58 (DC/DC) converter
60 transistor (for USB-A outlet)
62 filter/lightning and ESD protection (for USB-A outlet)
64 charging port controller
66 outlet plug for USB-A
67 (step of) receiving tri-state signal
68 (step of) measuring power drawn via fourth interface
69 (step of) obtaining PED power limit
70 (step of) measuring power drawn via third and fifth interfaces
71 (step of) comparing measurement with PED power limit
72 (step of) sending power control signal to direct current outlet units
73 (step of) switching-off alternating current outlet
80, 82, 84 power measurement unit
81, 83, 85 switching unit

The invention claimed is:

1. A power management and distribution device for powering a personal electronic device via a direct current outlet unit at a passenger seat in an airplane cabin, the power management and distribution device comprising:

a first interface for receiving an electrical supply power from a master control unit connected to a primary power source;

a second interface for supplying the electrical supply power received at said first interface to another power management and distribution device;

a third interface for supplying the electrical supply power received at said first interface to the direct current outlet unit for the personal electronic device;

a further interface for supplying the electrical supply power received at said first interface to either an inflight entertainment screen or an alternating current outlet at the passenger seat;

a power measurement device configured to measure an electrical outlet power drawn via the third interface and the further interface; and a control unit configured to compare the electrical outlet power measured by the power measurement device with a personal electronic device power limit and to control the electrical outlet power drawn by the direct current outlet unit via the third interface based on said comparison;

wherein the control unit is configured to switch the alternating current outlet on or off based on said comparison; and/or wherein the control unit is configured to subtract the power drawn from the inflight entertainment screen via the interface from a predefined power limit of the power management and distribution device to obtain the PED power limit.

2. The power management and distribution device according to claim 1, wherein the control unit is configured to set a power limit for the electrical outlet power drawn by the direct current outlet unit via the third interface and to adjust said power limit to a non-zero value based on said comparison.

3. The power management and distribution device according to claim 2, wherein the power measurement device is configured to measure the power drawn via the third interface and the further interface, and wherein the control unit is configured to compare the measured power with the PED power limit and to decrease the power limit for the electrical outlet power drawn by the direct current outlet unit via the third interface to a non-zero value and/or to switch the alternating current outlet at the further interface off, if the measured power exceeds the PED power limit.

4. The power management and distribution device according to claim 3, wherein the control unit is configured to determine whether to decrease the power limit for the direct current outlet unit and/or to switch off the alternating current outlet on the basis of a priority setting, the priority setting being adjustable by a user.

5. The power management and distribution device according to claim 1, wherein the power measurement device comprises a power measurement unit for measuring the electrical outlet power drawn via the third interface and a separate power management unit for measuring the electrical outlet power drawn via the further interface.

6. The power management and distribution device according to claim 1, wherein the power management and distribution device is configured to supply electrical supply power to a plurality of direct current outlet units via the third interface and to supply electrical supply power to a plurality of inflight entertainment screens or alternating current outlets via the further interface.

7. The power management and distribution device according to claim 1, further comprising an AC/DC conversion device configured to convert an AC electrical supply power supplied by the master control unit via the first interface to DC power supplied to the third interface.

8. The power management and distribution device according to claim 1, further comprising a housing for housing all of the components of the power management and distribution device, the interfaces of the power management and distribution device being formed as plugs at an outer surface of the housing.

9. The power management and distribution device according to claim 1, wherein the control unit is configured to generate a power control signal for communicating a power limit for the electrical power drawn by the direct current outlet unit via the third interface, and wherein the power management and distribution device is configured to send the power control signal to the direct current outlet unit via the third interface.

10. A power management and distribution system, comprising:

at least one power management and distribution device according to claim 9; and the direct current outlet unit connectable to the third interface, the direct current outlet unit comprising at least one direct current outlet, and a power limiter being configured to receive the power control signal from the power management and distribution device and to limit the electrical power drawn by the direct current outlet unit to the power limit communicated with the power control signal.

11. The power management and distribution system according to claim 10, wherein the direct current outlet unit comprises a power delivery unit configured to negotiate a power contract with the coupled personal electronic device based on the power control signal received from the power management and distribution device via the third interface.

12. The power management and distribution system according to claim 10, comprising at least two direct current outlet units connected to the third interface and at least two alternating current outlets or two inflight entertainment screens connected to the further interface.

13. The power management and distribution system according to claim 10, further comprising:

the master control unit configured to receive primary electrical power from a primary power source; and wherein the power management and distribution device and the another power management and distribution device are each a respective one of a plurality of power management and distribution devices, each configured to receive electrical supply power from the master control unit via the first interface of the respective power management and distribution device, wherein a first power management and distribution device is connected to the master control unit via the first interface of the first power management and distribution device and a second power management and distribution device is connected via the first interface of the second power management and distribution device to the second interface of the first power management and distribution device in a daisy chain fashion.

\* \* \* \* \*